July 30, 1929.  A. H. BIERTUEMPFEL  1,722,268
AUTOMOBILE HEADLIGHT
Filed Nov. 19, 1927  3 Sheets-Sheet 1
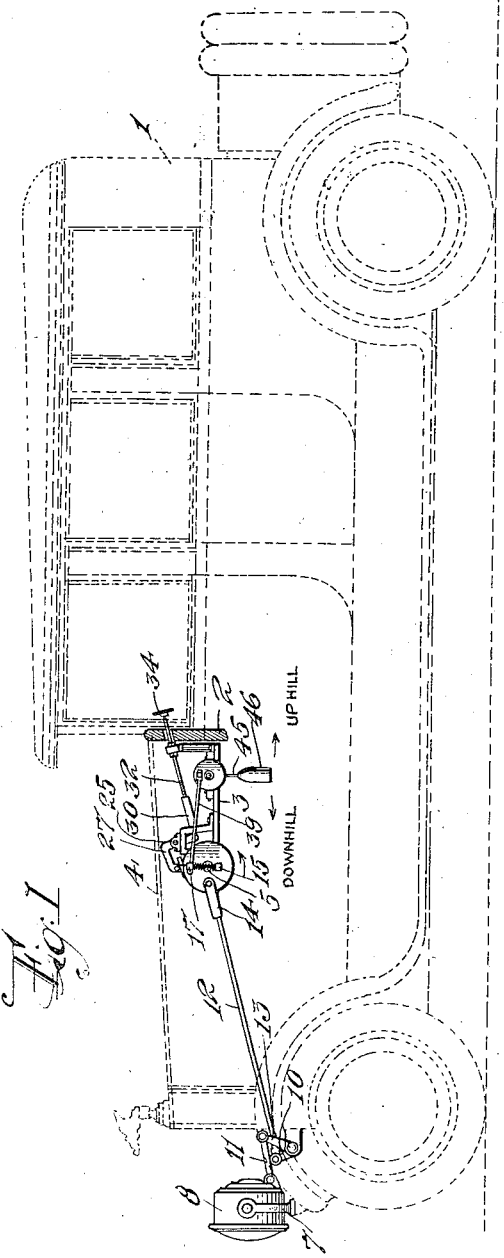
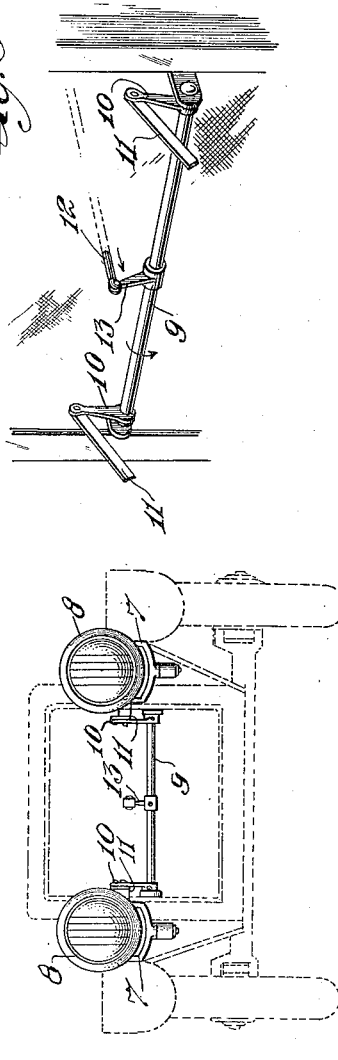
INVENTOR
Albert H. Biertuempfel,
BY
George D. Richards
ATTORNEY

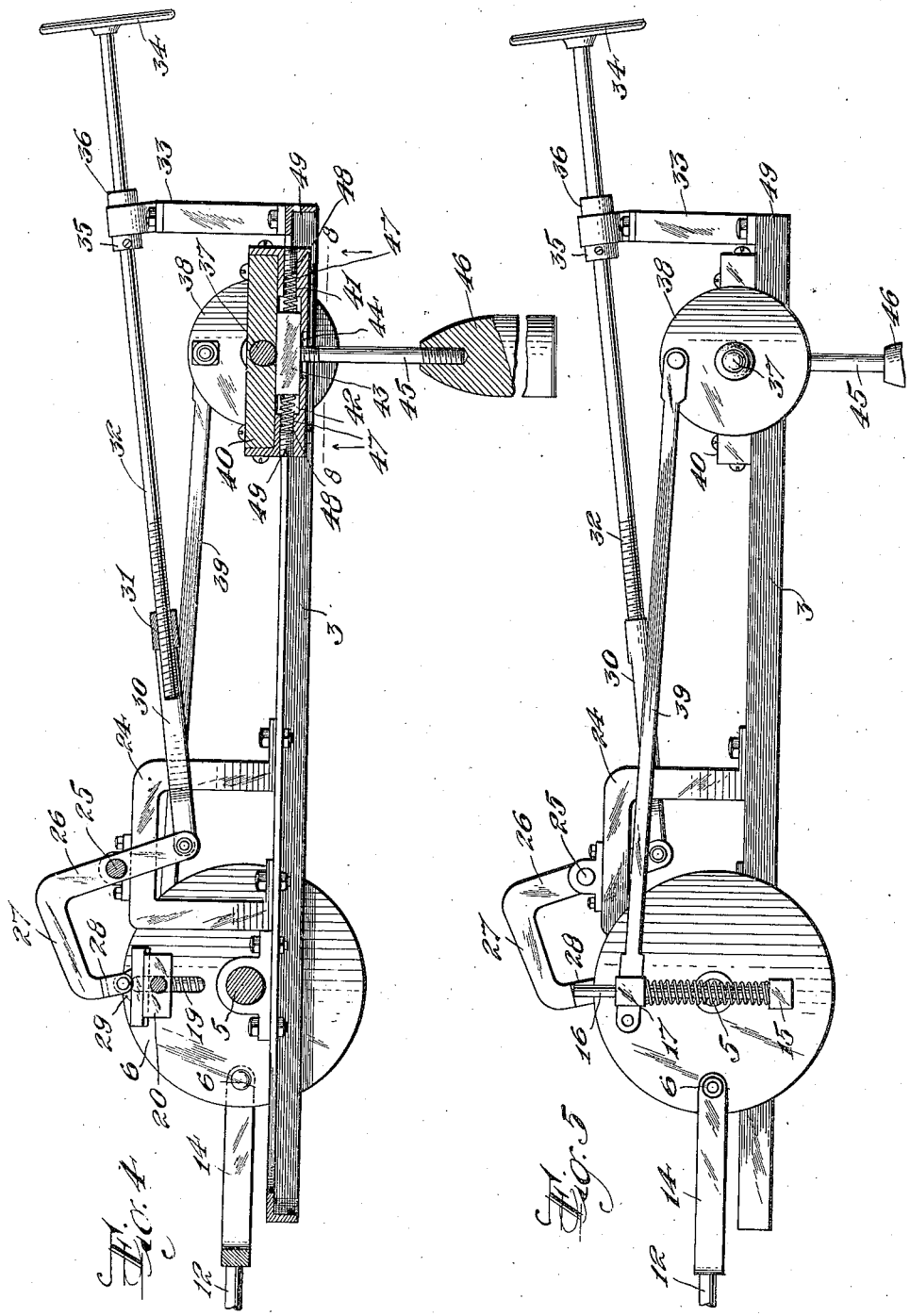

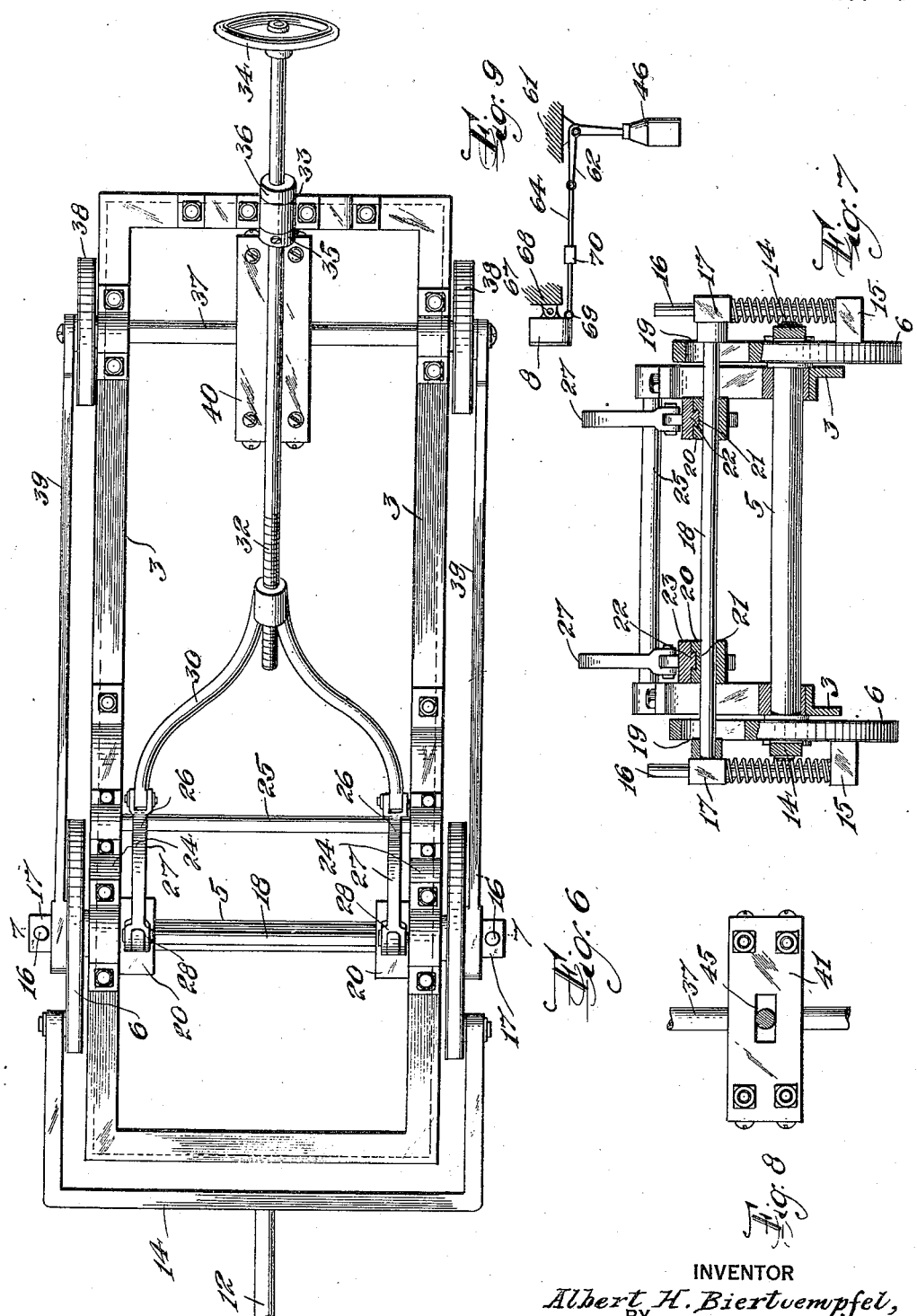

Patented July 30, 1929.

1,722,268

UNITED STATES PATENT OFFICE.

ALBERT H. BIERTUEMPFEL, OF NEWARK, NEW JERSEY.

AUTOMOBILE HEADLIGHT.

Application filed November 19, 1927. Serial No. 234,339.

The present invention relates, generally, to headlights for vehicles such as automobiles, and, more particularly, to automatic means for maintaining a headlight with its projected beam of light at a given angle with the road when the vehicle is traveling over a level course, and for depressing the line of projected light from the headlights when the vehicle is going either up hill or down hill. The invention, further, relates to means for adjusting a headlight to vary the angle which its beam makes with the road.

An object of the invention is to provide means which is operative automatically to tilt an automobile headlight to keep the projection of light therefrom on to the roadway at a given distance from the automobile on the level and to shorten this distance when on different inclines going either up or down from the horizontal.

Another object of the invention is to provide means in such apparatus for readily adjusting the fixed angle of tilt to desired values through means mounted on the dashboard of the automobile.

Other objects and advantages of the invention will be apparent from the drawings and from the following detailed description of apparatus and its parts embodying the invention; and the invention also consists in the details of construction of the apparatus and its parts all of which will be hereinafter more fully described and finally embodied in the claims appended hereto.

The invention is clearly illustrated in the accompanying drawings, in which:—

Figure 1 is a longitudinal elevation view of an automobile with apparatus embodying the invention mounted thereon; Figure 2 is a front elevation view in part, of the automobile of Figure 1, showing the apparatus involved; Figure 3 is a perspective view of details of the apparatus; Figures 4, 5, and 6 are, respectively, a longitudinal sectional view in elevation, a longitudinal side elevation view, and a plan view of the apparatus involved, in part cut away; Figure 7 is a plan view of details; Figure 8 is a bottom plan of details of the invention; and Figure 9 is a horizontal elevation view of another arrangement embodying the invention.

Similar characters of reference are employed in all of the hereinabove described views, to indicate corresponding parts.

Referring now to said drawings, the reference character 1 indicates in dotted lines an automobile adjacent to the dash 2 of which is mounted the frame 3 extending longitudinally in front of said dash 2 under the hood 4. Across said frame 3 is rotatably mounted the shaft 5 which carries fixed thereto at each end the disks 6, 6. At the front of said automobile 1 are mounted brackets 7, 7, in each of which is pivoted a headlight 8, on a transverse axis. A transverse rotatable shaft 9, crank arms 10, 10 and connecting rods 11, 11 connect said lamps 8, 8 to each other for synchronous tilting movement, each of said rods 11, 11 being pivoted to its respective lamp at a point below its pivoted suspension. A connecting rod 12 is pivoted at one end to crank arm 13 on said shaft 9 and at its other end to a forked member 14, which is pivotally connected to the outside of each of said discs 6, 6, at a point normally in horizontal alignment with the center of said shaft 5. An offset lug 15 mounted on the outside of each of said disks 6, 6 near its bottom carries an upwardly extending rod 16 which passes over the center of its respective disc 6 and carries the block 17 which is slidable longitudinally thereon. A transverse rod 18 passing through the radial slots 19, 19 in said discs 6, 6 fixedly connects said blocks 17, 17 to each other and carries fixed thereto one near each of said discs 6, 6 the longitudinal blocks 20, 20 each of which has a longitudinal dovetail groove 21 in the top surface thereof. Slidable in each of said grooves 21 is a dovetail tongue 22 formed on the bottom surface of a block 23.

The upwardly projecting frames 24 mounted one on each side of said frame 3 back of said shaft 5 carry the transverse shaft 25 at a level in the proximity of the top of said disc 6, 6. At each end of said shaft 25 is a lever 26 which extends generally in the up and down direction and carries a forwardly projecting fixed arm 27 from which depends the arm 28 which at its lower end pivotally connects with a respective block 23 through a lug 29 fixed to the respective block.

A rigid V member 30 has its outer ends pivoted one to each of said levers 26, 26 at the lower ends thereof and has formed through its base the longitudinal threaded passage 31. Threaded through said passage 31 is the rod 32 which extends backwardly and upwardly through an opening in a bracket 33 mounted at the rear of said frame 3 and then through said dash 2 where it terminates in a handle 34. Bushing 35 and 36 fixed to said rod 32, one on either side of said bracket 33, prevents longitudinal movement of said rod.

On said frame 3 back of said shaft 5 is mounted the rotatable shaft 37 which carries at its ends the crank disc 38, 38 and connecting rods 39, 39 pivoted at each end connect said disc 38, 38 to said shaft 18. Fixed to said shaft 37 is a longitudinal block 40 which carries beneath it the block 41. In the upper side of said block 41 and intermediate of its ends is the longitudinal passage 42 in which is mounted the block 43 which is of a length to permit longitudinal movement thereof between the ends of said passage 42 and of a thickness to make a sliding fit between the bottom surface of said block 40 and the bottom of said passage 42. Formed through the bottom of said block 41 and connecting with said passage 42 for a part of its length is the shorter longitudinal passage 44 through which extends a rod 45 which at its upper end is fixed to said block 43 and at its lower end carries the pendulum bob 46. Through each end of said block 41 is a longitudinal circular opening 47 in which is mounted a compression spring 48 which at one end presses against an end of said block 43 and at its other end against a set screw 49 extending inwardly from the outer end of a respective opening 47.

In Figure 9 is illustrated an elementary form of apparatus embodying the invention, in which a pendulum 46 is pivoted to a support 61 on an automobile or other body and carries a crank arm 62 which is rigidly fixed thereto and extends at right angles to the vertical axis of said pendulum, whereby said arm 62 is always horizontal when said pendulum is at equilibrium. A connecting rod 64 has a pivotal connection 65 with said arm 62, which connection 65 is aligned horizontally with the pivot of said pendulum 46 when the pendulum is in the normal vertical position of equilibrium. A headlight 8 pivoted at 67 to a support 68 on the automobile or other body is pivotally connected to said connecting rod 64 at a pivot 69 at a point below said pivotal connection 67, and a turnbuckle 70, or equivalent means, on said connecting rod 64 serves to lengthen or shorten said rod 64 to give a normal alignment to said lamp 66 whereby, for example, it is normally tilted downwardly when said pendulum 46 is in the normal equilibrium position.

In the use and operation of both embodiments of the invention as hereinabove described the principles involved in maintaining the light beam constant at a predetermined and set angle with respect to the longitudinal axis of the automobile, and consequently at a predetermined constant distance from the automobile, whenever in the horizontal position and for tilting the beam downwardly whenever the automobile is on either an upward or downward incline are as follows: The weight of said pendulum 46 serves to move into and hold the lamps 8, 8 at a fixed angular relation to the horizontal when the automobile body is in the horizontal position or moves into the horizontal from some other position; and the horizontal alignment of the pivotal connection of said forked member 14 and said discs 6, 6, with respect to said shaft 5 provides that, whenever the automobile moves from the horizontal onto either the upward or a downward slope, the pendulum 46 causes the rotation of said discs 6, 6 with the consequent retraction of said forked member 14 and the retraction of the bottoms of said lamps 8, 8 to tilt them down and thereby lower the light beams therefrom.

In the apparatus of Figs. 1 to 8 there is the additional feature of control and adjustability of the amount of degree of tilt of the lamp 8, 8 for a given change of alignment of the automobile from the horizontal, without changing the normal tilt of said lamps 8, 8 when the automobile is in the horizontal position. This control and adjustment is secured by rotation of said hand wheel 34, and movement of the elements connected therebetween and said discs 6, 6 without moving said discs 6, 6. That is to say, the distance between said shaft 18 and said shaft 5 can be changed or varied without rotational movement of said disc 6, 6. By rotating said wheel 34 and shaft 33 in the clockwise direction, facing said dashboard 2, said arms 28, 28 are depressed and said shaft 18 is moved downwardly toward said shaft 5 and held there against the pressure of said springs 19, 19. The throw or angular movement of said connecting rod 39 when actuated by said pendulum 46 is thereby decreased, so that when the automobile moves from the horizontal, to either a downward slope or to an upward slope, the degrees of rotational movement of said discs 6, 6 caused by pendulum 46 is less than before this adjustment was made. This lessened degree of rotational movement of said discs 6, 6 in turn affects the degree of movement of said lamps 8, 8 when tilted therethrough by means of said pendulum 46. By rotating said wheel 34 in the counterclockwise direction said arm 28 is raised and there is effected a consequent increase in angular movement of said discs 6, 6 and said lamps 8, 8 for a given angular movement of said pendulum 46. The change however is made without affecting the horizontal alignment of the pivotal connection of said forked member 14 and discs 6, 6 with respect to said shaft 5 because the movement of said arms 28, 28 in the horizontal direction is not transmitted to said shaft 5 or disks 6, 6 since this movement will be taken up by the sliding connection between said blocks 20 and 23 and the pivotal connection of said arm 28, 28 and their respective block 23.

Of course, I am aware that other changes may be made in the general arrangements and combinations of the various devices and parts, as well as in the details of the construction of the said parts, without departing from the scope of the present invention as set forth in the foregoing specification, and as defined in the clauses of the claim which are appended thereto. Hence, I do not limit my present invention to the exact arrangements and combinations of the several devices and parts as described in the foregoing specification, nor do I confine myself to the exact details of the construction of the said parts as illustrated in the accompanying drawings.

I claim:—

1. In combination with a vehicle, a headlight pivoted for tilting movement with respect to a transverse axis, a crank mounted for movement about a transverse axis and pivotally connected to said headlight, a counter weight having a pivotal connection with said crank, said pivotal connection being movable to vary its distance from the axis of said crank, and means for moving said pivotal connection to various positions with respect to said crank.

2. In combination with a vehicle, a headlight pivoted for tilting movement with respect to a transverse axis, a crank mounted for movement about a transverse axis and having a pivotal connection to said headlight, a counter weight having a pivotal connection with said crank, last said pivotal connection being movable to vary its distance from the axis of said crank, the pivotal connection between said crank and said headlight, in the horizontal position of said vehicle, being aligned horizontally with the main axis of said crank.

3. In combination with a vehicle, a headlight pivoted for tilting movement with respect to a transverse axis, a crank, a connecting rod in operative relation between said headlight and said crank, a second connecting rod in pivotal relation with said crank at one end, a second crank connected to the other end of said second connecting rod, and a counterweight connected to said second crank, the connection of said first connecting rod to first said crank being horizontally aligned with its main axis in the horizontal position of said vehicle.

4. In combination with a vehicle, a headlight mounted for tilting movement across a transverse axis, a crank, a connecting rod between said headlight and said crank, a second connecting rod having at one end a pivotal connection with said crank, said pivotal connection being adjustable to vary its distance from the main axis of said crank, a second crank connected to said second connecting rod at the other end thereof, and a counterweight connected to said second crank.

5. In combination with a vehicle, a headlight mounted for tilting movement across a transverse axis, a crank, a connecting rod between said headlight and said crank, a second connecting rod having at one end a pivotal connection with said crank, said pivotal connection being adjustable to vary its distance from the main axis of said crank, a second crank connected to said second connecting rod at the other end thereof, and a counterweight connected to said second crank, and means for moving said pivotal connection to change its distance from the main axis of said first crank.

6. In combination with a vehicle, a headlight mounted for tilting movement across a transverse axis, a crank, a connecting rod between said headlight and said crank, a second connecting rod having at one end a pivotal connection with said crank, said pivotal connection being adjustable to vary its distance from the main axis of said crank, a second crank connected to said second connecting rod at the other end thereof, and a counterweight connected to said second crank, and means for moving said pivotal connection to change its distance from the main axis of said first crank, and shock absorbing means between said counterweight and said second crank adapted to take up shocks along the longitudinal axis of said vehicle.

7. In combination with a vehicle, a headlight mounted for tilting movement across a transverse line, a member pivoted for movement about a transverse axis, a connecting rod having pivotal connection at one end with said headlight and having a pivotal connection at its other end to said pivoted member, a second pivoted member, a second connecting rod having a pivotal connection at one end with said first pivoted member and having a pivotal connection at its other end with said second pivoted member, one of said pivotal connections being movable to change its distance from its main axis, and a counterweight connected to said second pivoted member.

8. In combination with a vehicle, a lamp mounted for tilting movement across a transverse line, a member pivoted for movement about a transverse axis, a second member pivoted for movement about another transverse axis, a connecting rod between said lamp and first said pivoted member, a pivotal connection on said first pivoted member and movable radially thereon, a connecting rod between said pivotal connection and said second pivoted member, a pendulum connected with said second pivoted member, a lever pivoted to said vehicle and having a sliding connection with said pivotal connection and adapted for rotation about its axis to move said pivotal connection radially toward and from the axis of said first pivoted member, and means for adjustably moving said lever to change the radial position of said pivotal member.

9. In combination with a vehicle, a lamp mounted for tilting movement across a transverse line, a member pivoted for movement about a transverse axis, a second member pivoted for movement about another transverse axis, a connecting rod between said lamp and first said pivoted member, a pivotal connection on said first pivoted member and movable radially thereon, a connecting rod between said pivotal connection and said second pivoted member, a pendulum connected with said second pivoted member, a lever pivoted to said vehicle and having a sliding connection with said pivotal connection and adapted for rotation about its axis to move said pivotal connection radially toward and from the axis of said first pivoted member, and means for adjustably moving said lever to change the radial position of said pivotal member, and shock absorbing means between said pendulum and its pivot adapted to take up shocks along the longitudinal axis of said vehicle.

10. In combination, a headlight pivoted for tilting movement with respect to a transverse axis, a pendulum mounted for movement on a transverse axis, and means connecting said headlight and said pendulum adapted to translate movement of said pendulum in either direction from the vertical into a downward tilting movement of said headlight, including a crank which in the vertical position of said pendulum is horizontally aligned with its main axis.

In testimony, that I claim the invention set forth above I have hereunto set my hand this 7th day of November, 1927.

ALBERT H. BIERTUEMPFEL.